(12) United States Patent
Doan et al.

(10) Patent No.: US 7,603,420 B2
(45) Date of Patent: Oct. 13, 2009

(54) METHOD AND APPARATUS FOR AUTOMATIC E-MAIL RESPONSE INTERRUPTION BASED ON USER ACTIVITY

(75) Inventors: Christopher Hoang Doan, Austin, TX (US); Liliana Orozco, Del Valle, TX (US)

(73) Assignee: International Business Machines Corporation, Armonk, NY (US)

( * ) Notice: Subject to any disclaimer, the term of this patent is extended or adjusted under 35 U.S.C. 154(b) by 1253 days.

(21) Appl. No.: 10/815,215

(22) Filed: Mar. 31, 2004

(65) Prior Publication Data

US 2005/0223062 A1 Oct. 6, 2005

(51) Int. Cl.
*G06F 15/16* (2006.01)
*G06F 7/04* (2006.01)

(52) U.S. Cl. .................. 709/206; 709/204; 726/4; 726/21; 726/28; 726/29

(58) Field of Classification Search ............ 709/206, 709/204; 726/4, 21, 28, 29
See application file for complete search history.

(56) References Cited

U.S. PATENT DOCUMENTS

| | | | | |
|---|---|---|---|---|
| 5,956,486 | A | 9/1999 | Hickman et al. | 395/200.36 |
| 5,978,566 | A | 11/1999 | Plank et al. | 395/200.36 |
| 6,021,433 | A | 2/2000 | Payne et al. | 709/219 |
| 6,032,192 | A | 2/2000 | Wegner et al. | 709/238 |
| 6,385,662 | B1 | 5/2002 | Moon et al. | 709/318 |
| 6,769,002 | B2 * | 7/2004 | Ayan | 707/104.1 |
| 7,010,790 | B2 * | 3/2006 | Marsot et al. | 718/105 |
| 2002/0010745 | A1 | 1/2002 | Schneider | 709/206 |
| 2002/0138582 | A1 | 9/2002 | Chandra et al. | 709/206 |
| 2002/0188663 | A1 | 12/2002 | Islam et al. | 709/202 |
| 2003/0018724 | A1 | 1/2003 | Mathewson, II et al. | 709/206 |
| 2003/0229670 | A1 * | 12/2003 | Beyda | 709/206 |

FOREIGN PATENT DOCUMENTS

| | | |
|---|---|---|
| JP | 11025013 | 1/1999 |
| JP | 2000148607 | 5/2000 |

OTHER PUBLICATIONS

IBM Technical Disclosure Bulletin, Fitzpatrick et al., "Automated Confirmation of Understanding", v36, n7, Jul. 1993, pp. 483-486.

* cited by examiner

*Primary Examiner*—Peling A. Shaw
(74) *Attorney, Agent, or Firm*—Yee & Associates, P.C.; Jeffrey S. LaBaw

(57) ABSTRACT

The present invention provides a method, apparatus, and computer instructions for automatic e-mail response interruption based on user activity. An e-mail message having an "interrupt" type designation is sent from an originator, and directed to one or more recipients. The receiving e-mail client filters incoming messages and determines whether an e-mail contains an interrupt designation. If an interrupt designation is found, the e-mail client automatically displays content of the interrupt e-mail and any pending actions required of the recipient in a forefront position in the user interface, such as through a popup window. This content display may be valid until the recipient has responded to or completes the pending action specified in the e-mail. The present invention also analyzes the sender-recipient relationship to determine if the sender has the authority to issue an interrupt e-mail to the particular recipient. This authority may be predicated on user settings or an external list, such as a corporate directory.

1 Claim, 5 Drawing Sheets

METHOD AND APPARATUS FOR AUTOMATIC E-MAIL RESPONSE INTERRUPTION BASED ON USER ACTIVITY

BACKGROUND OF THE INVENTION

1. Technical Field

The present invention relates generally to an improved data processing system for processing and displaying messages. In particular, the present invention provides an electronic mail messaging system for automatic e-mail response interruption based on user activity.

2. Description of Related Art

E-mail allows a person to quickly and easily send textual messages and other information, such as, for example, pictures, sound recordings, and formatted documents electronically to other e-mail users anywhere in the world. An e-mail system typically involves a server-based mail program residing on a server computer to manage the exchange of e-mail messages over one or more networks and a client-based mail program residing on the client to implement a mail box that receives and holds the e-mail messages for a user. Typically, these client-based programs also include a graphical user interface to enable a user to easily and conveniently open and read e-mail messages in addition to creating new e-mail messages.

An e-mail user will typically create a message using an e-mail program running on a computer connected to a computer network, such as a local area network (LAN), a wide area network (WAN), or the Internet. The message will include an e-mail "address" for the intended recipient. When the user has finished entering the message, the user may "send" the message to the intended recipient. The e-mail program then electronically transmits the message over the computer network. The recipient, using an e-mail program running on the recipient's computer, can then "receive" the message.

One problem with such an e-mail system is that important messages requiring immediate action may overlooked if the recipient is forced to sort through a mass of e-mails. Computer users may be busy at their computer terminals, focused on solving customer problems or writing relevant technical documents or references. As the influx of new e-mail to a recipient may be constant and rapid, it may be difficult for a user, visually scanning the inbox, to quickly identify important e-mail messages. In some cases, a user may receive hundreds of e-mail messages in a single day. Scanning the inbox is subject to user error in skipping or missing a message.

One solution to this identification problem is for the sender to indicate that the message content is important. Currently available e-mail systems employ e-mail flags to convey this critical information to the recipient. For example, an "urgent" flag setting may be used to indicate that an e-mail contains important information. The sender designates a message as urgent by selecting an option in the e-mail client prior to sending the message to the intended recipient. This "urgent" designation is appended to the message and subsequently displayed in an information field associated with the e-mail. For example, an information field of an e-mail may be populated with an exclamation mark (!) to indicate that the message is urgent. Consequently, when the e-mail is displayed in the inbox, the user may distinguish this urgent e-mail from other e-mails in the inbox due to the exclamation mark associated with the urgent e-mail. However, flag settings merely signify to the recipient that an e-mail, shown within the inbox, contains important information and needs to be read. In addition, current e-mail systems do not provide a clear indication that a particular response from the recipient is pending. Thus, current e-mail systems simply allow a recipient to identify important messages displayed in an inbox.

Therefore, it would be advantageous to have an improved method, apparatus, and computer instructions for indicating to an e-mail recipient that a particular e-mail is important and requires immediate action by providing automatic e-mail response interruption based on user activity. It would further be advantageous to have a mechanism for providing a clear indication that a response from the recipient is pending.

SUMMARY OF THE INVENTION

The present invention provides an e-mail type designation that allows for issuing an automatic e-mail response interruption based on user activity. An e-mail message, having an "interrupt" type designation, is sent from an originator and directed to one or more recipients. The receiving e-mail client filters incoming messages and determines whether the e-mail contains an interrupt designation. If an interrupt designation is found, the e-mail client automatically displays content of the interrupt email and any pending actions required of the recipient in a forefront position in the user interface on the client, such as through a popup window. The display of the interrupt e-mail content may be valid until the recipient has responded to the e-mail or completes the pending action specified in the e-mail. Due to the automatic presentation of the interrupt e-mail, the recipient is able to quickly and easily view critical e-mail messages, as well as complete the e-mail task or questions. The display of the interrupt e-mail content also provides a clear indication that a response from the recipient is still pending.

Furthermore, the use of the interrupt type designation may be controlled based on the sender's authority to issue an interrupt e-mail to a particular recipient. The authority to send an interrupt e-mail to a particular recipient may be predicated on the establishment of an organizational hierarchy based on the user's selection. For example, the user may establish an organizational hierarchy, wherein the authority to issue an interrupt e-mail to the user are assigned to individuals according to a user-defined organizational hierarchy. Client software may perform a directory lookup against the sending and receiving users when a message is delivered. Alternatively, the authority to issue an interrupt e-mail may be predicated on an external source, such as a corporate directory. A corporate directory has inherent properties regarding organizational structure, such as employee and employer relationship, manager and subordinate relationship, and hierarchical relationship.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
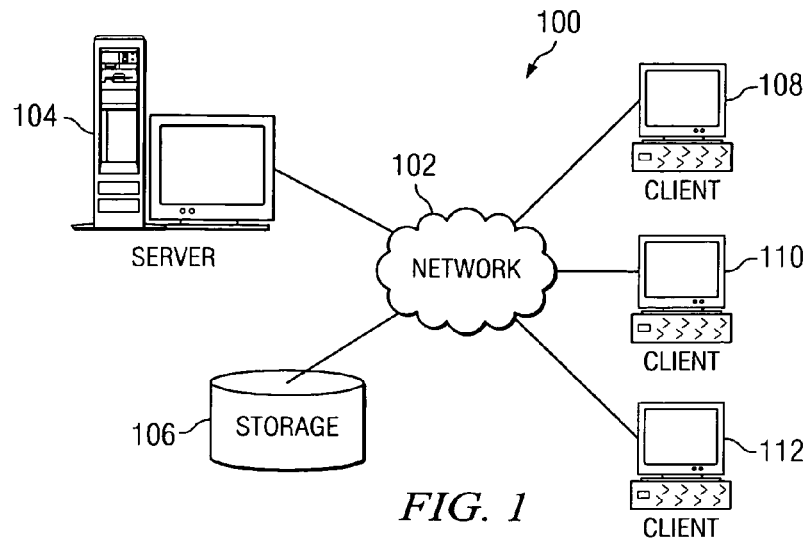
FIG. 1 depicts a representation of a network of data processing systems in which the present invention may be implemented.

With reference now to the figures, FIG. 1 depicts a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers or personal digital assistants (PDA) devices. In the depicted example, server 104 provides data, such as boot files, operating system images, and applications to clients 108-112. Clients 108, 110, and 112 are clients to server 104. Server 104 may act as an instant messaging server to facilitate the exchange of messages between users at clients, such as clients 108, 110, and 112. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
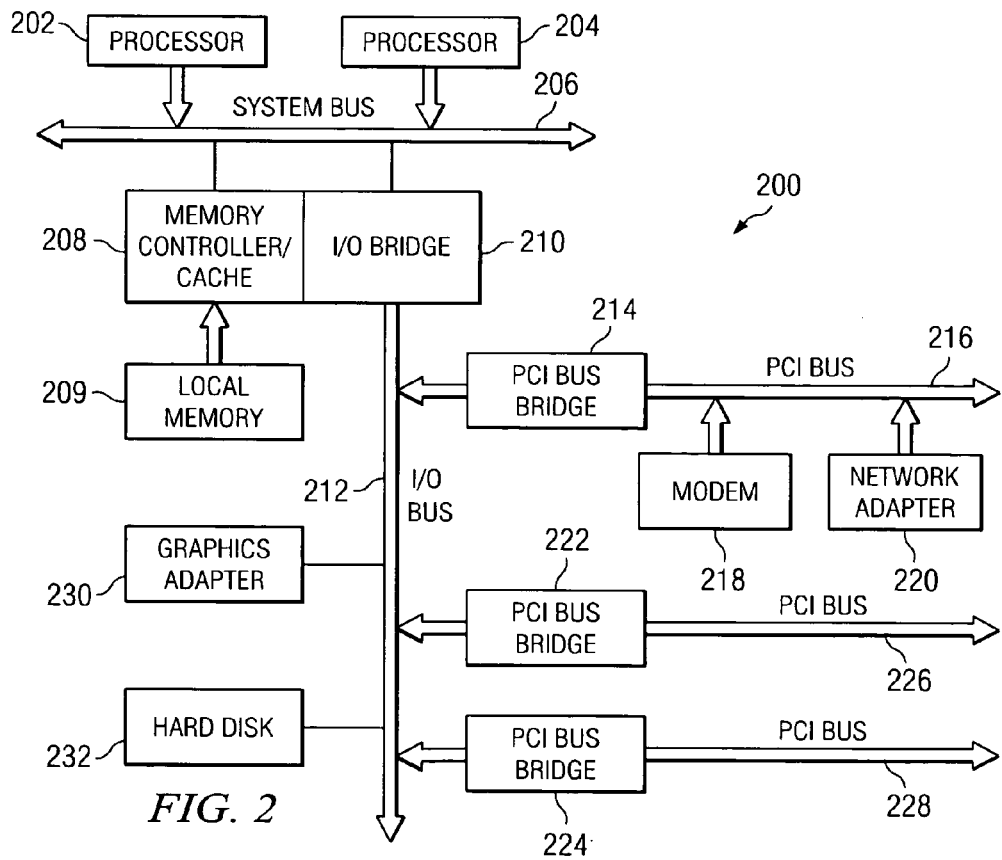
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
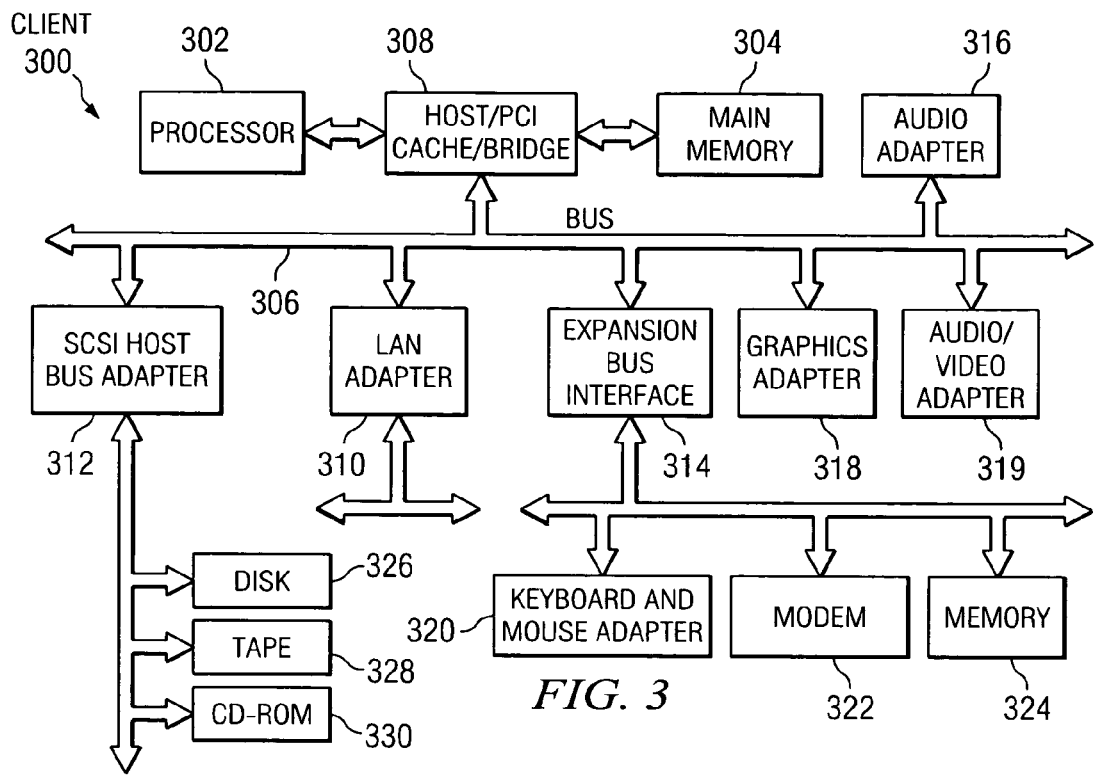
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention allows an e-mail sender to issue an interrupt e-mail to a recipient. This e-mail message includes an interrupt indicator in the form of either specific content within the subject line of the message, or a tag appended to the message to indicate that the message is designated as a type "interrupt". When an e-mail message is sent to a recipient, the receiving e-mail client filters the message to identify whether an e-mail contains an interrupt designation. For example, an interrupt designation of "/INTERRUPT" may be placed within the subject line of the e-mail message. If the receiving e-mail client has been configured to filter those messages that contain "/INTERRUPT" within the subject line of the e-mail message, the e-mail client may display the e-mail content not only within the e-mail client, but also display the e-mail content and any pending actions required of the recipient in such a manner as to attract the recipient's attention, such as through a popup window.

In an alternative example, the sender may select a flag option provided on the message interface in order to designate the e-mail as an interrupt e-mail. This interrupt flag may be included in the header or footer of the e-mail. When the receiving e-mail client filters the header or footer of the incoming e-mail, the interrupt tag is detected. As a result, the receiving e-mail client will handle the e-mail as an interrupt e-mail and display the e-mail content and any pending actions required of the recipient in such a manner as to attract the recipient's attention, such as through a popup window.

Due to the presentation of a popup window, a recipient is able to quickly and easily view critical e-mail messages, as well as complete the e-mail task or questions. The e-mail popup window may be valid until the recipient has responded to the e-mail or completes the pending action specified in the e-mail. The popup window also provides a clear indication that a response from the recipient is pending.

In addition, the use of the interrupt type designation may be controlled based on the sender's authority to issue an interrupt e-mail to a particular recipient. A user may establish an organizational hierarchy, wherein the authority to issue an interrupt e-mail to the user are assigned to individuals according to a user-defined organizational hierarchy. Client software may perform a directory lookup against the sending and receiving users when a message is delivered. Alternatively, an external source may be used to provide an authority list, such as a corporate telephone directory. A corporate telephone directory has inherent properties regarding organizational structure, such as employee and employer relationship, manager and subordinate relationship, and hierarchical relationship.

Figure 4:
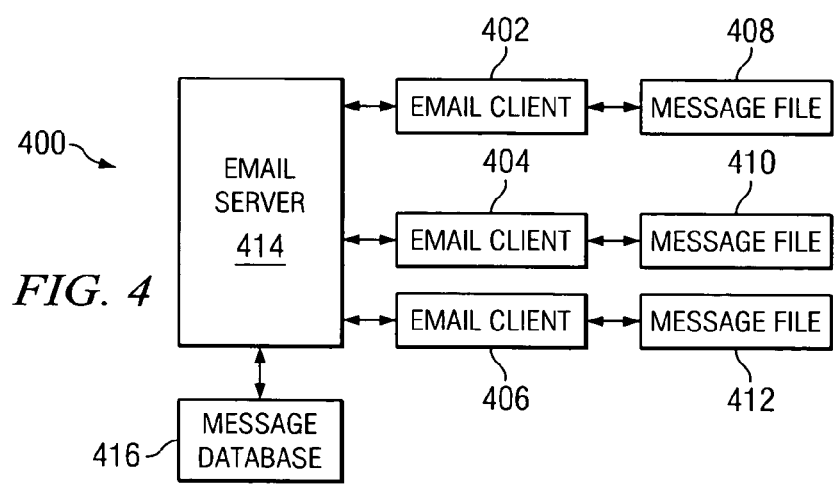
FIG. 4 is a block diagram of an exemplary electronic mail messaging system in accordance with a preferred embodiment of the present invention.

Turning now to FIG. 4, a diagram illustrating an exemplary electronic mail messaging system 400 is depicted in accordance with a preferred embodiment of the present invention. In this example, e-mail client 402, e-mail client 404, and e-mail client 406 are e-mail clients, programs, or applications located at different client data processing systems, such as client 108, client 110, and client 112 in FIG. 1. Message file 408, message file 410, and message file 412 are associated with these e-mail clients. These message files serve to store e-mail messages received by the clients and may be organized into various mailboxes. Examples of various mailboxes include, for example, an in folder, a sent folder, a deleted folder, and an outbox folder.

These e-mail programs may employ different protocols depending upon the implementation. For example, simple mail transfer protocol (SMTP) is a standard e-mail protocol that is based on TCP/IP. This protocol defines a message format and the message transfer agent, which stores and forwards the mail. Other protocols, such as post office protocol 3 (POP3), also may be employed.

These e-mail programs are used to send e-mail back and forth to different users through e-mail server 414. Messages sent to other e-mail clients are stored in e-mail message database 416. When an e-mail client connects to e-mail server 414, any messages for that particular client are then sent to the client.

E-mail clients 402, 404, and 406 may be implemented using presently available e-mail clients with an additional process or feature in which these clients now look for e-mail type designation as described above.

Figure 5:
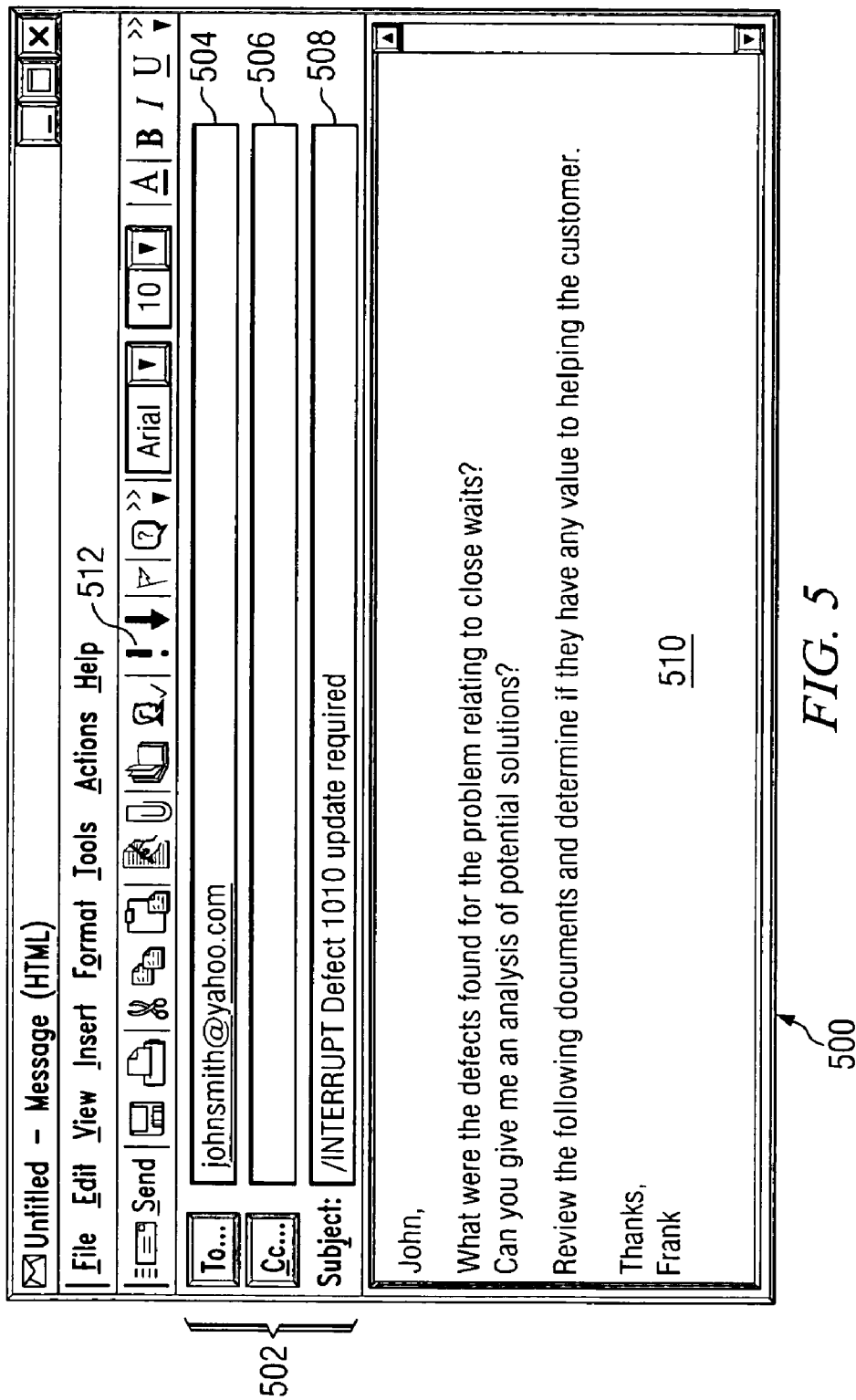
FIG. 5 are examples of graphical user interfaces that allow for designating an e-mail message as type "interrupt" in accordance with a preferred embodiment of the present invention.

Turning next to FIG. 5, an exemplary e-mail messaging window that allows for designating an e-mail message as type "interrupt" is depicted in accordance with a preferred embodiment of the present invention. The components illustrated in FIG. 5 may be found in an e-mail client, such as e-mail client 402, 404, or 406 in FIG. 4. These components may be implemented in a data processing system, such as data processing system 300 in FIG. 3.

When a user wants to issue an e-mail, a messaging window, such as message window 500 shown in FIG. 5, may be created. The upper portion of the e-mail messaging window typically, but not necessarily, contains various administration information 502 regarding the e-mail, such as the recipients of the message (TO: field 504 and CC: field 506) and subject line 508. Following administration information 502 is the text 510 of the e-mail message, and may contain various inquiries/ questions or other types of solicitation that the sender is asking or requesting of the recipient. For example, in this e-mail message there are inquiries of "What were the defects found for the problem relating to close waits?" and "Can you give me an analysis of potential solutions?" Also, the e-mail message includes a directive of "Review the following documents and determine if they have any value to helping the customer." The present invention allows a user to designate an e-mail as an interrupt e-mail prior to sending the e-mail to a recipient. Accordingly, the user may include an indicator in subject line 508 of the e-mail to allow a recipient e-mail system to identify that the e-mail is an interrupt e-mail. For example, the indicator "/INTERRUPT" may be included subject line 508, such that subject line 508 now reads, "/INTERRUPT Defect 1010 update requested". The e-mail message may then be sent to the intended recipients with the included interrupt indicator.

Another method of including an interrupt indicator within an e-mail message is using a selectable flag in an existing e-mail system, such as urgent flag option 512. Rather than populating the subject line with an interrupt indicator, the user may select urgent flag option 512 prior to sending the e-mail to designate the e-mail as an interrupt e-mail. The e-mail system software may be modified to attach a tag to the header or footer of the e-mail message when urgent flag option 512 is selected, such that a receiving e-mail system may detect that the incoming e-mail message is an interrupt e-mail. The e-mail message may then be sent to the intended recipients with the attached interrupt indicator.

It should be noted that the selectable flag option in FIG. 5 may also be a flag specially created as an interrupt flag, so as to provide the sender with an another level of e-mail designation type in addition to the urgent flag option.

Figure 6:
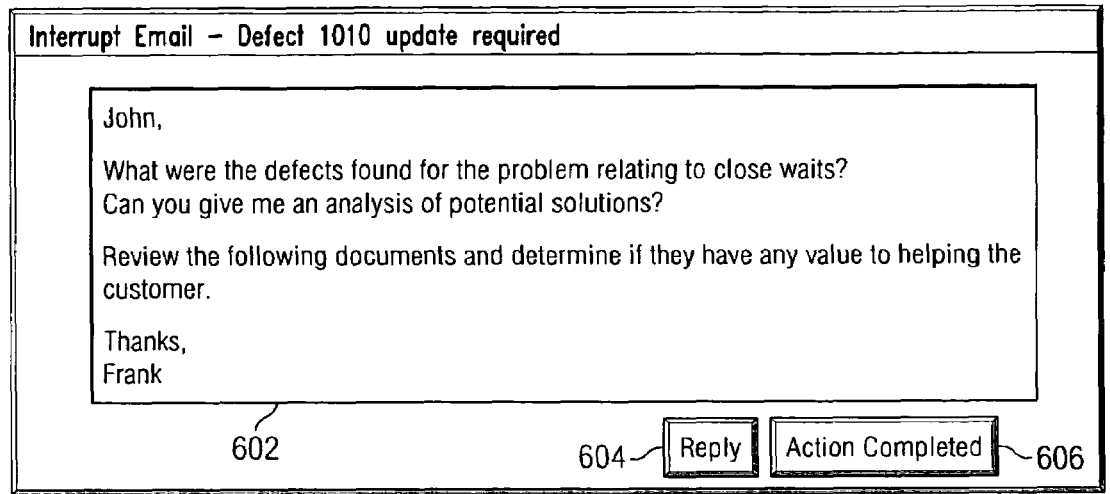
FIG. 6 is an example popup messaging window for indicating the receipt of an important e-mail message in accordance with a preferred embodiment of the present invention.

With reference now to FIG. 6, an example popup messaging window for indicating the receipt of an important e-mail message is depicted in accordance with a preferred embodiment of the present invention. Popup window 600 is presented for purposes of illustration and not meant as a limitation as to how messages may be presented. Popup window 600 is displayed when an interrupt e-mail message is received from another user.

In this example, popup window 600 is a messaging window displaying content 602 of the interrupt e-mail, including any pending actions required by the recipient. Although popup window 600 is illustrated as displaying the entire content of the e-mail, it should be noted that only a portion of the e-mail may be shown in popup window 600, such as, for example, the subject line. In this situation, the recipient is directed to the recipient's inbox, wherein the entire e-mail message may be viewed.

When an interrupt e-mail is received at an e-mail client, such as e-mail client 402 in FIG. 4, the e-mail client detects this type of e-mail and immediately displays the content of the e-mail in a popup window, such as popup window 600. Popup window 600 is brought to a forefront position of the user interface, and remains active in these illustrative examples until the user completes the e-mail inquiry or requested action by responding to the e-mail or by completing the requested task specified in the e-mail.

Popup window 600 may also include quick-reply buttons, such as reply button 604 and action completed button 606. Selecting reply button 604 may result in the generation of a reply message window, through which the recipient of the interrupt e-mail may respond to the sender. Selecting action completed button 606 may result in an automatic e-mail being sent back to the interrupt e-mail sender in order to notify the sender that the recipient has completed the action specified in the e-mail.

Note that popup window 600 preferably does not include a "close" button. Popup window 600 may be closed by replying to the sender or by completing the action specified in the e-mail. By preventing the recipient from closing popup window 600, the present invention may provide a clear indication that a particular response from the recipient is still pending.

Thus, as described above, instead of marking an e-mail message as important and having the important message placed in the recipient's inbox with other incoming messages where is may be overlooked or ignored, a popup window is displayed at the forefront of the recipient's desktop for an e-mail message designated as an interrupt e-mail. Various popup window displays may be used to differentiate messages of type interrupt from other normal messages in order to draw the user's attention to these important messages. In this manner, a user may easily be informed of messages that require immediate action than others received during an instant message session.

Figure 7:
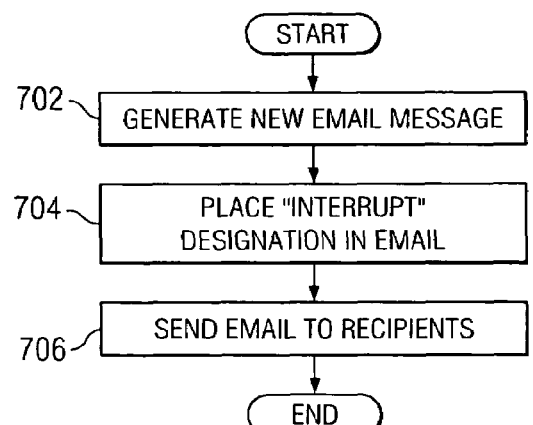
FIG. 7 is a flowchart of a process for issuing an e-mail message of type "interrupt" in accordance with a preferred embodiment of the present invention.

Turning next to FIG. 7, a flowchart of a process for issuing an e-mail message of type "interrupt" is depicted in accordance with a preferred embodiment of the present invention. The process illustrated in FIG. 7 may be implemented in an e-mail messaging system, such as e-mail system 400 in FIG. 4.

The process begins by generating a new e-mail message (step 702). Next, the sender designates the new e-mail message as an interrupt e-mail (step 704). An e-mail may be designated as an interrupt e-mail by using an indicator in the form of either specific content within the subject line of the message, or a tag appended to the message to indicate that the message is designated as a type "interrupt". For example, the sender may designate an e-mail as an interrupt e-mail by including an interrupt indicator, such as "/INTERRUPT", within the subject line of the message. Alternatively, a menu option may be provided to the sender. When the menu option is selected, this results in the message being designated as an interrupt e-mail through a tag attached to the header or footer of the message. The e-mail client then sends the e-mail to the intended recipients (step 706).

As mentioned previously, when an e-mail message is sent to a recipient, the receiving e-mail client filters the message to identify whether an e-mail contains an interrupt designation. If the receiving e-mail client determines that the incoming e-mail is an interrupt e-mail, the e-mail client automatically displays the content of the interrupt e-mail message and any pending actions required of the recipient, such as through a popup window.

For example, if an interrupt designation is placed within the subject line of the e-mail message and the receiving e-mail client has been configured to filter those messages that contain a specific interrupt designation within the subject line, the e-mail client may generate a popup window containing the e-mail content and any pending actions required of the recipient.

In an alternative example, the sender may select a flag option provided on the message interface in order to designate the e-mail as an interrupt e-mail. This interrupt flag may be attached to the header or footer of the e-mail. When the receiving e-mail client filters the header or footer of the incoming e-mail, the interrupt tag is detected. As a result, the receiving e-mail client handles the e-mail as an interrupt e-mail and generates a popup window containing the e-mail content and any pending actions required of the recipient message.

In some circumstances, however, it may be desirable to limit the ability to issue an interrupt e-mail. The use of the interrupt type designation may be controlled based on the sender's authority to issue an interrupt e-mail to a particular recipient. The authority to send an interrupt e-mail to a particular recipient may be predicated on the establishment of an organizational hierarchy based on a user's selection or on an external list, such as a corporate telephone directory. A directory look-up using the organizational hierarchy is performed to determine the relationship of the sender and recipients when an e-mail message is generated. From the hierarchy relationship, it may be determined whether the sender may issue an interrupt e-mail to a particular recipient.

In an illustrative embodiment, an employee's superior, such as a manager, may be granted the authority issue an interrupt e-mail to the employee. In a similar fashion, the employee's peers may be able to issue interrupt e-mails to the employee. However, the employee may not be granted the authority to send an interrupt e-mail to a manager, since the manager is higher in the organizational hierarchy of the corporation. Thus, the use of interrupt e-mails may be controlled based on the hierarchical relationship between the sender and recipient.

Figure 8:
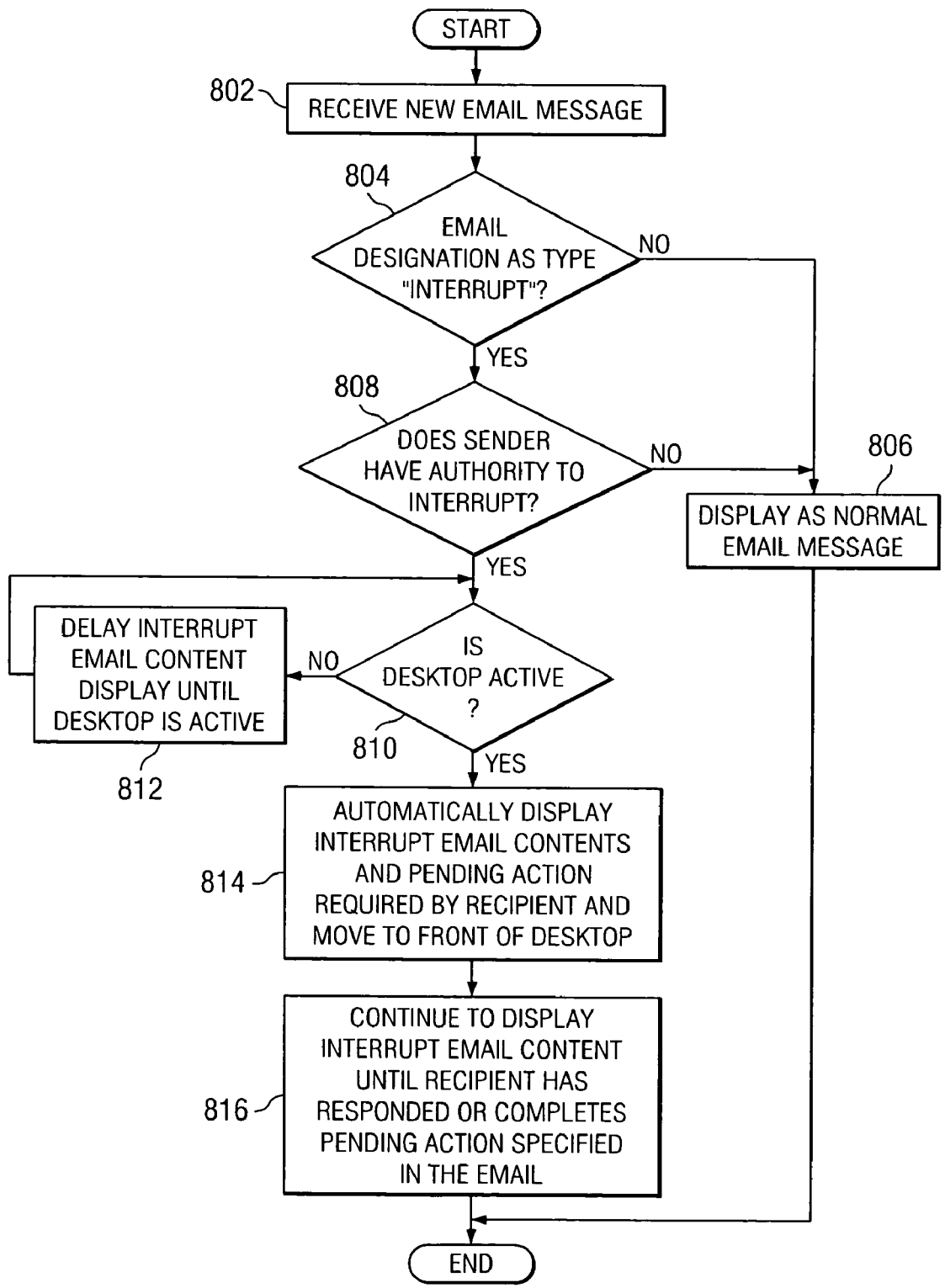
FIG. 8 is a flowchart of a process for handling receipt of an e-mail message of type "interrupt" in accordance with a preferred embodiment of the present invention.

Turning next to FIG. 8, a flowchart of a process for handling receipt of an e-mail message of type "interrupt" is depicted in accordance with a preferred embodiment of the present invention. The process illustrated in FIG. 8 may be implemented in an e-mail messaging system, such as e-mail system 400 in FIG. 4.

The process begins by receiving a new e-mail message (step 802). The receiving e-mail client then analyzes the type designation of the incoming message and determines if the message is an interrupt e-mail (step 804). The e-mail client may determine if the message is an interrupt e-mail by implementing filtering procedures present in existing e-mail system. For example, the e-mail client may be configured to filter on the contents of the subject line. Thus, if the subject line included an interrupt designation, the e-mail client may distinguish incoming interrupt e-mails from normal e-mails. Alternatively, the e-mail client may check the header or footer of the incoming e-mail message for a tag that indicates that the message is an interrupt e-mail. These filtering techniques may be used alone or in combination in order to differentiate important e-mails from normal e-mails. If it is determined that the e-mail message is not an interrupt e-mail, the message is accepted by the receiving e-mail client and displayed in the messaging window of the e-mail client in a normal manner (step 806).

Turning back to step 804, if the e-mail type is determined to be an interrupt e-mail, a determination is made whether the sender has the authority to issue such an e-mail to the particular recipient (step 808). This step is performed in order to establish the hierarchical relationship of the e-mail participants. The e-mail client may perform a directory lookup to identify the relationship of the sender and recipient. Based on the relationship, it may be determined whether the sender has the authority to issue an interrupt e-mail to the recipient. For example, if the employee's manager sends an interrupt e-mail to the employee, then the receiving e-mail client determines that the relationship is such that it handles the e-mail as an interrupt e-mail. However, if the employee sends an interrupt e-mail is the employee's manager, the receiving e-mail client determines that the employee does not have the authority to issue an interrupt e-mail to the manager and handles the e-mail in a normal fashion.

Thus, if it is determined that the sender does not have appropriate authority to issue an interrupt e-mail to the recipient, the message is accepted by the receiving e-mail client and displayed in the inbox of the e-mail client in a normal manner (step 806).

If it is determined that the sender may issue interrupt e-mails to the recipient, a determination is then made as to whether the desktop is active (step 810). For example, if the user is currently working on the computer, it is presumed that the desktop is active. In contrast, the desktop is inactive if the user steps away from the computer for a period of time and/or if the user "locks" the computer until the user returns. If it is determined that the desktop is active, the e-mail client automatically displays the content of the e-mail on the client and displays this content in a forefront position of the user interface (step 814). This content display, such as through a popup window, may contain the e-mail message content and any pending action required of the recipient. By employing this interrupt e-mail system, the recipient is immediately notified of important messages and may perform the requested action without delay.

Furthermore, the e-mail client may continue to display the interrupt e-mail content on the desktop until the recipient has responded to the e-mail or completed the pending action specified in the e-mail (step 816). For example, although the recipient may maneuver around a popup window containing the interrupt e-mail (e.g., move another program to a forefront position of the user interface), the recipient may not terminate the popup window without performing the requested action in the e-mail or responding to the e-mail. In this manner, the present invention may force the recipient to perform the action specified in the interrupt e-mail, as well as providing a clear indication that a response from the recipient is still pending.

If it is determined that the desktop is inactive, the display of the interrupt e-mail content may be delayed until the desktop is active (step 812).

Thus, the present invention provides an e-mail designation mechanism that allows for automatic e-mail response interruption based on user activity. The present invention provides an advantage over existing e-mail system by allowing an authorized sender to issue an interrupt e-mail to a recipient in order to bring an important message to the attention of a recipient. In addition, the mechanism of the present invention requires the recipient to act upon the interrupt e-mail before being allowed to terminate the automatic e-mail content display. In this manner, critical e-mails and the pending status of the required action may be conveyed to a recipient.

The mechanism of the present invention allows a sender to issue an e-mail message having an interrupt type designation to one or more recipients. The receiving e-mail client filters incoming messages and determines whether an e-mail contains an interrupt designation. If an interrupt designation is found, the e-mail client automatically displays content of the interrupt e-mail and any pending actions required of the recipient, such as through a popup window. This interrupt e-mail content display may be valid until the recipient has responded of completes the pending action specified in the e-mail. Due to the automatic interrupt e-mail display, the recipient is able to quickly and easily view critical e-mail messages, as well as complete the e-mail task or questions.

Furthermore, the use of the interrupt type designation may be controlled based on the sender's authority to issue an interrupt e-mail to a particular recipient. The authority to send an interrupt e-mail to a particular recipient may be predicated on the establishment of an organizational hierarchy based on the user's selection. Client software may perform a directory lookup against the sending and receiving users when a message is delivered. Alternatively, the authority to override settings may be predicated on an external source, such as a corporate telephone directory.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for filtering electronic mail messages on a client computer in distributed computer network, the method comprising the computer implemented steps of:

determining whether an interrupt is associated with an electronic mail message, wherein the interrupt is a specific interrupt designation of the electronic mail message, and wherein the electronic mail message comprises an interrupt indicator attached to one of a header and a footer of the electronic mail message;

determining whether a sender of the electronic mail message is authorized to send the electronic mail message with the interrupt indicator, wherein the authorization to send the electronic mail message with the interrupt indicator is based upon a corporate directory that includes an organizational hierarchy structure;

responsive to determining that the interrupt is associated with the electronic mail message and the sender is authorized to send the electronic mail message with the interrupt indicator, determining whether a desktop of the client computer is active;

responsive to determining that the desktop of the client computer is active, automatically displaying a content of the electronic mail message in a popup window, wherein the popup window comprises a reply button and an action completed button, and wherein the popup window is displayed in a forefront position on the desktop of the client computer, and wherein the popup window remains in the forefront position until a recipient of the electronic mail message responds to the content of the electronic mail message by selecting one of the reply button and the action completed button;

responsive to the recipient of the electronic mail message selecting one of the reply button and the action completed button, closing the popup window;

responsive to determining that the sender is not authorized to send the electronic mail message with the interrupt indicator, delivering the electronic mail message to the recipient inbox; and responsive to determining that the desktop of the client computer is inactive, delaying the display of the electronic mail message until the desktop becomes active.

* * * * *

UNITED STATES PATENT AND TRADEMARK OFFICE
CERTIFICATE OF CORRECTION

PATENT NO. : 7,603,420 B2
APPLICATION NO. : 10/815215
DATED : October 13, 2009
INVENTOR(S) : Doan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1596 days.

Signed and Sealed this

Fifth Day of October, 2010

David J. Kappos
*Director of the United States Patent and Trademark Office*